United States Patent [19]

Simms et al.

[11] Patent Number: 5,424,364
[45] Date of Patent: Jun. 13, 1995

[54] COMB PIGMENT DISPERSANTS

[75] Inventors: John A. Simms; Michael W. J. West, both of Wilmington, Del.

[73] Assignee: E. I. Du Pont de Nemours & Company, Wilmington, Del.

[21] Appl. No.: 245,133

[22] Filed: May 17, 1994

[51] Int. Cl.$^6$ .................. C08F 8/00; C08L 67/00
[52] U.S. Cl. .................. 525/170; 525/158; 525/169; 525/179; 525/282; 525/375; 525/423; 525/438; 523/500; 523/501
[58] Field of Search ............. 525/170, 158, 169, 179, 525/375, 282, 423, 438; 523/500, 501

[56] References Cited

U.S. PATENT DOCUMENTS

| | | | |
|---|---|---|---|
| 4,060,511 | 11/1977 | Sinclair et al. | 524/533 |
| 4,656,226 | 4/1987 | Hutchins et al. | 525/93 |
| 4,812,517 | 3/1989 | West et al. | 525/94 |
| 5,087,675 | 2/1992 | Takeo et al. | 525/455 |
| 5,100,969 | 3/1992 | Yamamoto et al. | 525/327.2 |
| 5,187,229 | 2/1993 | Yamamoto et al. | 525/123 |
| 5,221,700 | 6/1993 | Gilbert et al. | 525/523 |
| 5,231,131 | 7/1993 | Chu et al. | 524/533 |
| 5,270,399 | 12/1993 | Czornij et al. | 525/327.6 |

FOREIGN PATENT DOCUMENTS 5-036470 5/1993 Japan .
2001083 1/1979 United Kingdom .

OTHER PUBLICATIONS

J. D. Schofield, *Handbook of Coatings Additives*, 2, Chapter 3, 1992.
T. Sato, Stability of Dispersions, *J. Coatings Technology*, 65, 113, 1993—Oct.
H. L. Jakubauskas, Use of A–B Block Polymers as Dispersants for Non-aqueous Coating Systems, *J. Coatings Technology*, 58, 71, 1986—May.
K. Tsutsiu et al, A New Approach to the Design of Pigment Dispersing Resins, *J. Coatings Technology*, 69, 27–35, 1990—Dec.

Primary Examiner—Melvyn I. Marquis
Assistant Examiner—Randy Gulakowski
Attorney, Agent, or Firm—Chris P. Konkol

[57] ABSTRACT

The polymeric pigment dispersants of this invention are polyester/acrylic comb polymers which are the reaction product of 20–85% of a carboxylic functional polyester copolymer, 10–50% of an oxirane substituted acrylic copolymer, and 2 to 20% of an imide compound. These materials disperse a wide variety of pigments and are useful in solvent borne coatings where they can provide improved efficiency of pigment use, lower paint viscosity, and reduced emission of volatile organic solvent.

10 Claims, No Drawings

COMB PIGMENT DISPERSANTS

FIELD OF THE INVENTION

The polymeric pigment dispersants of this invention are polyester/acrylic comb polymers having a cyclic imide pigment absorbing group. These dispersants are useful for dispersing a wide variety of pigments.

BACKGROUND OF INVENTION

The most useful pigment dispersants are broadly compatible with other polymers, selectively adsorbed by a wide range of pigments, soluble in a wide range of solvents, and not displaced from pigment surfaces by polar solvents.

Polymeric pigment dispersants are discussed by J. D. Schofield, in chapter 3 of the *Handbook of Coatings Additives*, Vol. 2, ed. by L. J. Calbo (Marcel Dekker, Inc., NY 1992). Much of the past activity has been with random copolymers, but these relatively inefficient materials are being replaced by structured pigment dispersants having AB block copolymer or comb structures.

Pigment dispersions are thought to work by forming a layer of polymer which extends into the surrounding medium to provide entropic stabilization. The pigment particles do not come close enough to one another to flocculate, unless the stabilizing layer on one pigment particle can be be forced into the layer on another. This causes an increase in concentration within the area between the pigment particles, and this ordering is counter to the entropic tendency in nature to disorder. Further reference to this theory can be found in T. Sato, "Stability of Dispersions", *J. Coating Technology*, 65, p. 113, 1993.

H. L. Jakubauskas has investigated the relative effectiveness of random and structured copolymers as dispersants and indicates that comb and block configurations are likely to be equally effective for dispersion, and more effective that random copolymers which can cause false body by bridging between pigment particles ("Use of A-B Block Polymers as Dispersants for Non-aqueous Coating Systems," *J. Coatings Technology*, Vol. 58, p. 71, 1986).

Recent work on methacrylate AB block copolymer dispersants is described in "Acrylic Pigment Dispersants Made by Group Transfer Polymerization" by C. S. Hutchins and A. C. Shor, U.S. Pat. No. 4,656,226 (1987). Functional groups which give less yellowing when the dispersant is exposed to light were discovered by M. W. J. West, "Dispersants Resistant to Color Change," U.S. Pat. No. 4,812,512 (1989).

All-acrylic comb polymer pigment dispersants are described by Chu, Fryd and Lynch in U.S. Pat. No. 5,231,131. These materials were made by a macromonomer approach. The polymeric backbone is hydrophobic in comparison to side chains. The polymer is functional in carboxylic acid groups so it can be used to make waterborne pigment dispersants. They do not disclose mixed polyester/acrylic comb polymers, nor the use of imides as pigment active groups.

Comb polymer salts using polyester teeth and polyalkyene imine backbones are described by A. Topham, in "Polymeric Dispersing Agents," GB 2001083 (1979). Agents for dispersing solids, particularly dyestuffs and pigments, in organic liquids, comprise a poly(lower alkylene)imine chain attached to which are at least two polyester chains by means of salt and/or amide links and are obtained by reacting a poly(lower alkylene)imine with a polyester having a free carboxylic acid group. Poly-12-hydroxystearic acid is typically the acid copolymer.

In "A New Approach to the Design of Pigment Dispersing Resins," K. Tsutsiu et al., *J. Coatings Technology*, Vol. 69, 27–35 (1990), star-shaped acrylic resins were prepared by the reaction of terminal carboxyl groups, at one end of an acrylic prepolymer, with oxirane groups of polyglycidyl compounds. Star-shaped polyester resin was also synthesized in the same manner as the star-shaped acrylic resins, but using a carboxyl terminated polyester pre-polymer in place of an acrylic prepolymer. The presence of the star-shaped acrylic/polyester resin improves compatibility between linear acrylic resin and polyester resin, which minimizes color difference, because the star-shaped acrylic/polyester resin possesses good compatibility with both acrylic and polyester resins.

The preparation of comb polymers with polyester teeth inserted via a macromonomer route into a methacrylate polymer backbone containing amino groups is described by T. Yamamto et al in U.S. Pat. No. 5,100,969 and U.S. Pat. No. 5,187,229. A pigment dispersing agent for paints is constituted with a particular acrylic polymer component having a tertiary amino group and/or a basic nitrogen-containing heterocyclic ring and a particular polyester component. This pigment dispersing agent is applicable to both acrylic resin series and polyester resin series paints as well as thermosetting type paints.

Comb polymer dispersants with polyester teeth, acrylic backbone, and nitrobenzoate introduced through glycidyl methacrylate have been described in JP9 3036460B and JP 59174620A. These dispersants also include a hydroxyl containing comonomer in the backbone. They are more completely described as thermosetting resins containing lactone-modified copolymers that comprise (1) 5–30 wt. % of hydroxyl group containing ethylenically unsaturated monomers, (2) 2–20 wt. % of glycidyl group containing ethylenically unsaturated monomers, (3) 5–50 wt. % of 4–22 carbon straight, branched or cyclic alkyl group containing ethylenically unsaturated monomers, (4) 0–30 wt. % of other ethylenically unsaturated monomers, (5) 10–70 wt. % of lactone compounds, and (6) 1–20 wt. % of glycidyl group reactive aromatic compounds. A group (1) monomer is, for example, 2-hydroxyethyl methacrylate; a group (2) monomer is, for example, glycidyl methacrylate; a group (3) monomer is, for example, butyl methacrylate or stearyl acrylate; a group (4) monomer is, for example, methyl methacrylate, styrene or itaconic acid; and group (5) monomer is, for example, beta-propiolactone or epsilon-caprolactone; and a group (6) member is preferably p-nitrobenzoic acid or p-amino benzoic acid. The resins have improved mutual solubility in binder and pigment dispersibility.

Past work therefore indicates that comb polymers can be outstanding dispersing agents if properly structured. Nevertheless, dispersants which are effective in dispersing a wide variety of pigments in various coatings, which minimize color and improve the properties of the coatings in which they are used, and which are readily prepared, are needed in the field of high performance coatings.

BRIEF DESCRIPTION OF THE INVENTION

The present invention is directed to a novel comb pigment dispersant. In particular the comb pigment dispersant has a molecular weight of 4000 to 50,000 and comprises:

(a) about 20 to 85 percent by weight of the dispersant of a polyester copolymer having a molecular weight of about 500 to 10,000 which polyester copolymer is carboxylic-acid functional;

(b) about 10 to 50 percent by wieght of the dispersant of an acrylic copolymer having a molecular weight of 2500 to 10,000 which, before reaction, contains 25 to 75 percent by weight of an oxirane containing monomeric unit; and (c) about 2 to 20 percent by weight of the dispersant of a monomeric unit containing a cyclic imide pigment absorbing group.

These dispersants are useful for dispersing a wide variety of pigments and are useful in solvent borne coatings where they provide improved efficiency of pigment use, lower paint viscosity, and reduced emission of volatile organic solvent.

DETAILED DESCRIPTION OF THE INVENTION

The polymeric pigment dispersants of this invention are polyester/acrylic comb polymers containing (by weight) 20-85% polyester polymer, 10-50% acrylic polymer and 2 to 20% of a cyclic imide component. Such dispersants can be prepared by reacting an oxirane substituted acrylic polymer with a carboxylic-acid functional polyester and a pigment absorbing compound such as phthalimide in the presence of a catalyst.

Prior art methods of synthesizing a comb polymer almost always involve preparation of a macromonomer by reacting the carboxyl or hydroxyl terminated polyester with either glycidyl methacrylate or a vinyl isocyanate. The functionality in the backbone was then introduced by copolymerization with a acid, basic or amide comonomers, or by reaction of an aromatic carboxylic acid with a limited amount of glycidyl methyacrylate.

The preferred approach of making the present dispersants, however, involves the novel method of simultaneously reacting the carboxyl tooth and the pigment active group with the oxirane containing acrylic backbone polymer. This is a simpler process than the preparation of a macromonomer followed by copolymerization. It is particularly advantageous when the functional groups introduced on the backbone are not available through commercial comonomers.

In making a comb polymer with polyester teeth and imide pigment active groups on an acrylic backbone, the mono-carboxyl functional polyester tooth is suitably prepared by one of a number of methods. It is possible to insure monofunctionality of the tooth. The tooth molecular weight can be controlled. Pigment dispersants with teeth having molecular weights below 500 are not likely to produce non-flocculating dispersions. Those with teeth above 8000 in molecular weight are unnecessarily viscous.

Methods of tooth preparation will first be described, and then comb dispersant synthesis will be discussed. As indicated above, the dispersant comprises about 20-85 percent, by weight of the dispersant, of a carboxylic copolymer. Suitably such polyesters have a molecular weight of about 500 to 10,000, preferably 1000 to 5000.

With regard to preparing polyester teeth, the homopolymerization of hydroxyacids or the copolymerization of hydroxyacids with a lactone such as caprolactone is an excellent approach to the synthesis of monocarboxylic polyesters. These copolyesters will also have a terminal hydroxyl group unless monocarboxylic acid is introduced in the esterification to cap the hydroxyl. This process is illustrated in the following figure where a saturated or unsaturated fatty acid such as stearic acid is the capping monocarboxylic acid. Water equivalent to the hydroxyl content is also formed. Methanesulfonic acid or toluenesulfonic acid are useful catalysts for the polymerization.

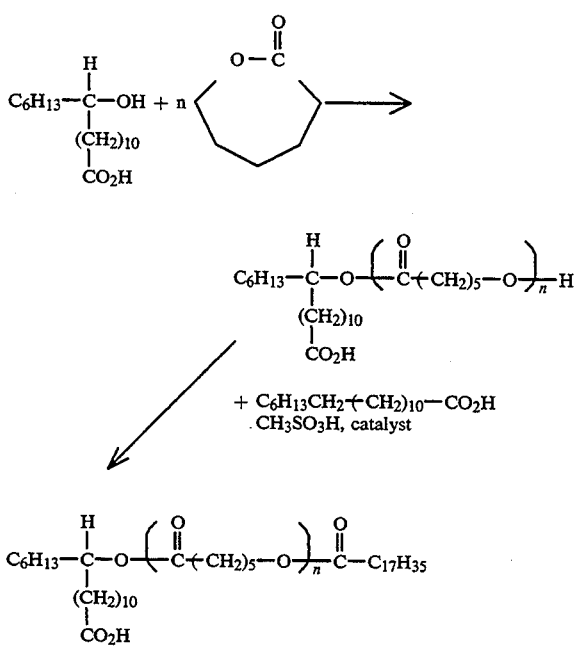

The product is a monofunctional acid copolyester which can be used as teeth for the dispersant. The introduction of different concentrations of caprolactone in these copolyesters provides the tool for varying their solubility and compatibility. For example, as caprolactone is added to form 60% of the copolymer, the acid concentration decreases from about 28 to 15 (measured as mg KOH/g of polyester) and the tooth molecular weight increases from about 2000 to about 3500 (calculated from the acid number). The molecular weight determined by size exclusion chromatography using polyestyrene standards increases from about 3700 to 6000. The increase in $M_w$ is also reflected in the viscosity of the products, which at 89% solids increases from 10 Stokes to about 50 Stokes. A tendency for the copolymer to crystallize is also observed when it contains 60% caprolactone, which tendency is not present at 40% caprolactone.

The reaction of 2,2'-bis(hydroxymethyl)propionic acid with caprolactone provides another useful way to make the monoacid functional polyester for the tooth on these comb dispersants.

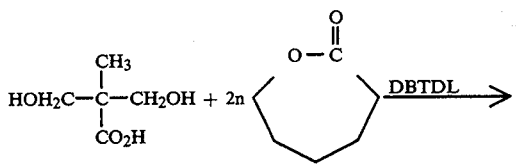

epoxides with cyclic anhydrides. The initiating species can be either an alcohol or a tnonocarboxylic acid for the purpose of this invention. In the following illustration, 2-ethylhexanol is used in the polymerization. If an excess of anhydride is used, the end group will be an acid, and the product will be the monocarboxyl functional polyester needed for these comb polymers.

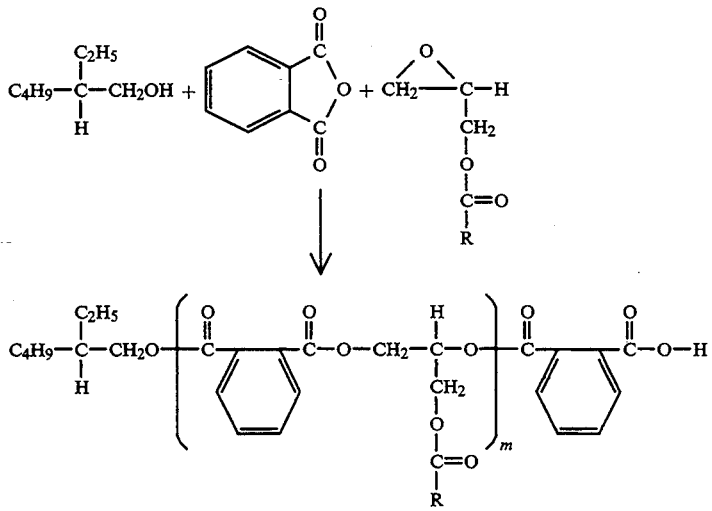

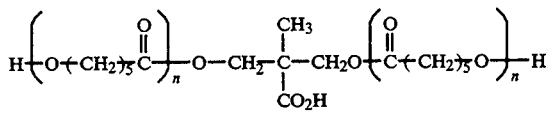

Dibutyl tin dilaurate is used to catalyze the polymerization. The extent of caprolactone modification thought to be most useful is n equal to 2 to 8 in the above formula, with the preferred value being 3–5. This gives sufficient chain length for entropic stabilization without the strong tendency to crystallize found at higher n's.

The reaction of a cyclic anhydride with an epoxide to prepare a polyester is also disclosed by H. G. Waddill, J. G. Milligan, W. J. Peppel, in "Unsaturated Polyester Resins from Epoxides and Anhydrides", *I&EC Product Research and Development*, Vol. 3 (1964). This article describes unsaturated polyesters made using a mixture of phthalic anhydride, maleic anhydride and propylene oxide with tetramethylammonium bromide catalyst. Lithium chloride has been used commercially. Propylene glycol was used as the initiating glycol.

The use of 2-ethylhexanol as the initiating alcohol and caprolactone as a modifying comonomer is illustrated in the following equation.

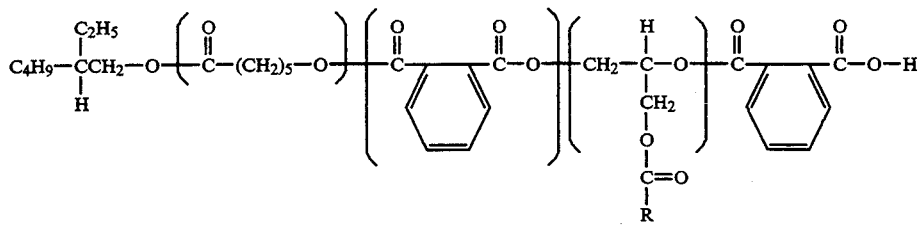

The intermediate hydroxyester crystallizes at n=5, but crystallization does not occur in the comb polymer. This approach also has the advantage of providing hydroxyl groups in the tooth for subsequent reaction with melamine, isocyanate or anhydride crosslinkers. When n=5, the tooth, in one example, has a $M_n$ of 1324 based on its being a monoacid. Citric acid, a trihydroxy acid, might also be used in this approach as an initiator to make a trihydroxy/monoacid polyester oligomer.

Other hydroxy acids and lactones would of course be of use in these processes.

Polyester teeth can also be prepared from oxirane/anhydride copolymers. S. Inoue and T. Aida in *New Methods for Polymer Synthesis*, ed. by W. J. Mijs (Plenum Press, NY 1992), on p. 43, describe a general synthesis of polyesters by the alternating copolymerization of Dibutyl tin dilaurate can be used as the catalyst in the preparation of terpolymer "teeth" by this process. The stoichiometry can be varied to change the acid number. A number of regular trends may be observed, particularly in the relationship of $M_n$ from acid number to $M_n$ measured by size exclusion chromatography. In general, as acid number goes down, $M_n$ by size exclusion chromatography increases. The ratio of $M_n$ by size exclusion chromatography using polystyrene standards to molecular weight by acid number is 1.25. Thus, the bulky side chains in these polymers make them more like polystyrene in size than the products from hydroxy acids and caprolactone.

Viscosity is of course related to molecular weight. In one example, the viscosity at 80% solids varied from 3 to 7.5 Stokes as the chromatography $M_n$ varied from 2000 to 5000.

A trend has also been observed relating $M_n$ in the tooth preparation to cloud formation upon standing. The trend suggests that caprolactone may be crystallizing over time with the higher molecular blocks having longer runs that crystallize faster.

Even the lowest $M_n$ sample had become cloudy within 4 months. Heating at 60° C. produced a clear solution, again indicating the cloud is due to polycaprolactone segments, which have a m.p. of 60° C. at high molecular weight.

In the preparation of random polyesterpolyols from diols, triols, acids, anhydrides and diesters, the polyesters are usually not esterified to zero acid content. Many of these materials of 1000 to 6000 molecular weight contain residual carboxyl groups on the average of one or less per molecule. Thus, these copolyesters are mixtures of acid free polyester polyols and polyols containing one acid group. The acid functional component of the blend can serve as the polyester tooth in a comb polymer synthesis. The residual non-acid functional polyol is an inert diluent. This approach provides a third way to produce hydroxyl functional teeth for comb polymers.

The acid number of useful polyesters is thought to be between about 5 and 20, with a preferred range of 10 to 15.

The dispersants also comprise 10–50%, preferably 15 to 40%, by weight of the dispersant, of an acrylic copolymer having a molecular weight of 2500 to 10,000, preferably 2500 to 8000, and which (before reaction) contains 25 to 75 percent by weight of an oxirane containing monomeric unit to provide good functionality for grafting while still producing relatively low viscosity comb polymers. In preparing such a backbone material, various considerations are involved. A preferred backbone polymer comprises a n-butyl methacrylate and glycidyl methacrylate in a weight ratio of about 40/60 having an $M_n$ of about 5000. This can be prepared at about 50% solids solution in butyl acetate. Typically the distribution is monotonic, but somewhat skewed to the low molecular weight side. Assuming the polymer has a actual $M_n$ of about 5000, this suitably corresponds to a functionality of about 20. Such a copolymer can be prepared by a process of addition of the monomer mix over 120 minutes to refluxing solvent such as n-butyl acetate concurrently with Vazo ™ 67 initiator, followed by a 30-minute finishing feed of Vazo ™ 67 initiator, the latter being commercially available from E. I. DuPont de Nemours & Co. (Wilmington, Del.).

As indicated above, the dispersant further contains about 2 to 20 percent, by weight of the dispersant, of a cyclic imide as a pigment active group. By the term imide is meant the group (═NH), wherein the ring is formed by bonding the nitrogen to either two carbonyl or one carbonyl and one sulfonyl group. Phthalimide, maleimide, and succinimide are particularly useful examples of the first group while saccharine is a particularly useful example of the second group. They readily react with the backbone oxirane using base catalysis. They produce a low color, neutral polymer which has no tendency to yellow upon exposure. Most preferred is phthalimide.

Concentrations of cyclic imide in the dispersant as low as 2% to as high as 20% by weight are useful, the preferred concentration between 6 and 12 percent. At low concentrations there may not be sufficient interaction with the pigment to avoid flocculation, particularly in more polar solvents. At the higher concentrations, low polarity solvents may not be satisfactory solvents for the dispersant.

Having described each of the components of the dispersant the final comb dispersant may be formed by reacting a glycidyl methacrylate copolymer with a carboxyl functional polyester and pigment active group. This approach is outlined in the following equation:

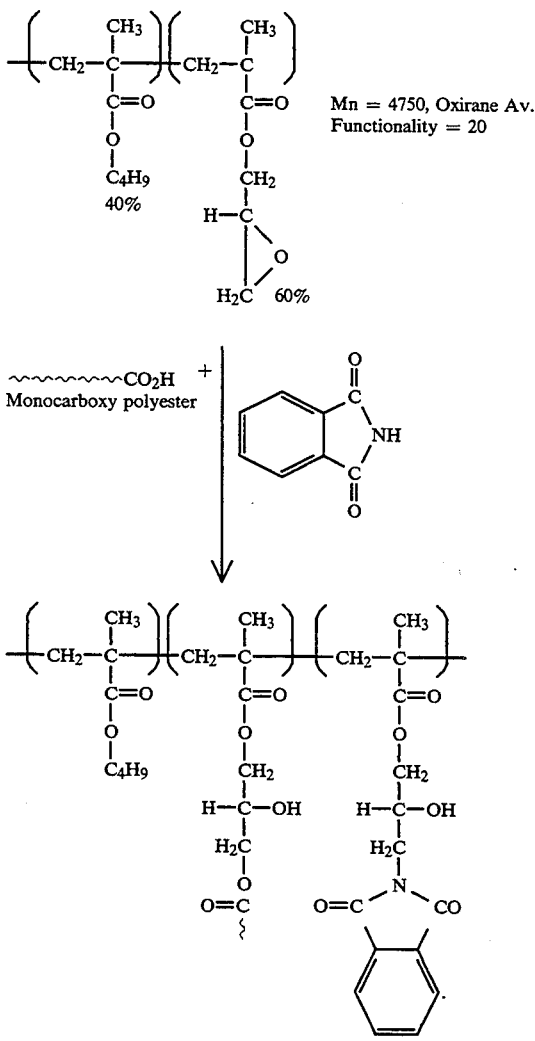

A preferred approach is to use a polyester tooth made by copolymerizing 12-hydroxystearic acid, caprolactone (about 60% of the copolyester) and stearic acid. The preferred pigment active group is phthalimide as, for example, 8.5% of the comb polymer by weight.

Comb polymers preferably have between 50 and 75% tooth. Backbones with less than about 25% glycidyl methacrylate (GMA) content or teeth molecular weight less than 1000 produce much lower concentrations of tooth in the comb.

The $M_n$ of the teeth influences comb viscosity. For example, in a series of dispersants containing 70–74% tooth and 8.5% phthalimide, as the tooth molecular weight increased from 2000 to 4000, the viscosity of the comb solution increased from 1.8 to 4.8 Stokes (at 60% nonvolatile content).

Preferable tooth $M_n$ is between 1000 and 5000 based on its calculation from acid number, assuming monofunctionality in acid.

Combs with mixed teeth of substantially different solubility could be prepared by making two runs of carboxyl teeth with substantially different levels of caprolactone modification, even to the use of no caprolactone at all. For example, a comb made with half of the teeth based on 12-hydroxystearic acid having no caprolactone and half with a high level of caprolactone should be able to disperse pigments in both non polar and polar solvents. Dispersibility from aliphatic hydrocarbon solvents to alcohol rich solvent systems would be possible.

To form a pigment dispersion or a mill base, pigments are added to the dispersant and the the pigments are dispersed using conventional techniques such as high speed mixing, ball milling, sand grinding, attritor grinding or two or three roll milling. The resulting pigment dispersion has a pigment to dispersant binder weight ratio of about 0.1/100 to 1500/100.

Any of the conventional pigments used in paints can be used to form the pigment dispersion such as metallic oxides like titanium dioxide, iron oxides of various colors, zinc oxide, carbon black, filler pigments such as talc, china clay, barytes, carbonates, silicates and a wide variety of organic pigments such as quinacridones, phthalocyanines, perylenes, azo pigments, indanthrones, carbazoles such as carbazole violet, isoindolinones, thioindigio reds, benzimidazolinones, metallic flakes such as aluminum flake, pearlescent flakes and the like.

It may be desirable to add other optional ingredients to the pigment dispersion such as antioxidants, flow control agents, rheology control agents such as fumed silica, microgels, UV stabilizers, screeners, quenchers and absorbers.

Pigment dispersions of this invention can be added to a variety of solvent borne coating compositions such a primers, primer surfacers, topcoats which may be monocoats or basecoats of a clear coat base coat finish. These compositions preferably have an acrylic polymer or polyester polymer or a blend of these types of coating vehicle as the film forming constituent and may also contain crosslinking agents such as blocked isocyanates, isocyanates, alkylated melamines, epoxy resins and the like. Other film forming polymers can also be used, such as acrylourethanes, polyester urethanes, polyethers and polyether urethanes that are compatible with the pigment dispersion. It is desirable to have the film forming polymer of the coating composition be similar to the polymer of the pigment dispersion so that on curing the polymer of the pigment dispersion will cure with the coating polymer and become part of the film or coating. The dual nature (both acrylic and polyester) makes this more likely.

The following examples illustrate the invention. All parts and percentages are on a weight basis unless otherwise indicated. Molecular weights are determined by gel permeation chromatorgraphy using polystyrene as the standard and tetrahydrofuran as the carrier solvent.

EXAMPLES

In the following examples, four different types of polyester teeth will be described. The first is based on the reaction of commercial grade 12-hydroxystearic acid (12-HSA), which also contains stearic acid (SA) in about a 5/1 ratio of 12-HSA to SA with caprolactone. The amount of caprolactone can be varied from 0 to about 70% of the charge. As the amount of caprolactone increases, the molecular weight of the tooth increases (unless compensating amounts of monocarboxylic acid are included). The second approach uses a bis-hydroxy, monocarboxylic acid, 2,2'-(dimethylol) propionic acid as the initiator for caprolactone. This provides a tooth with hydroxyl terminal groups. The third approach uses the copolymerization of phthalic anhydride with epoxy ester to generate a polyester. This material can also be modified with caprolactone with a proportional increase in molecular weight. The fourth approach is the synthesis of a random copolyester polyol containing residual carboxyl groups. In each case the key compositional variable is to have an average of only one carboxyl group on each tooth so the grafting reaction to the backbone does not result in appreciable crosslinking.

Example 1

This example illustrates preparation of a tooth component which is a copolymer of 12-hydroxystearic acid (from Polyester Corp.) and caprolactone (from Union Carbide Corp.) containing 61.5% caprolactone. The following materials were charged to a nitrogen blanketed reactor fitted with a stirrer, thermocouple, water separator and reflux condenser:

| Parts | Component |
|---|---|
| 965 | 12-Hydroxystearic acid |
| 1541 | Caprolactone |
| 2.5 | Methanesulfonic acid |
| 300 | Toluene |

The mixture was heated as the temperature increased from 150° to 167° C. over 4 hours 45 minutes as 44.7 parts of water was removed. This is the approximate amount for theoretical esterification of all the acid hydroxyl content of the reactants. The reaction product was characterized as follows:

| Parameter | Value |
|---|---|
| Solid (Percent) | 88.95 (theoretical), 89.14% |
| Acid Number (Solids Basis) | 15.57 |
| $M_n$ calc from Acid Number | 3603 |
| $M_n$ found by SEC (PS standards) | 6480 |

Other ratios of caprolactone produced the following teeth:

| Caprolactone (Percent) | Acid Number | $M_n$ from Acid Number | $M_n$ from SEC |
|---|---|---|---|
| 0 | 28.1 | 2000 | 3850 |
| 20 | 24.8 | 2260 | 4070 |
| 40 | 19.0 | 2950 | 5000 |

In related experiments, the effect on the molecular weight of of the copolyester of varying the amount of caprolactone and stearic acid is shown in the following table of predicted molecular weights:

| n* | Weight Caprolactone | FW Copolymer | Percent Caprolactone | Ratio 12-HSA/SA | Esterified $M_n$ |
|---|---|---|---|---|---|
| 0 | 0 | 290.4 | 0 | 6 | 1908.4 |
| 1 | 114 | 404.4 | 28.19 | 6 | 2592.4 |
| 2 | 228 | 518.4 | 43.98 | 6 | 3276.4 |
| 3 | 342 | 632.4 | 54.08 | 6 | 3960.4 |
| 4 | 456 | 746.4 | 61.09 | 6 | 4644.4 |
| 5 | 570 | 860.4 | 66.25 | 6 | 5328.4 |
| 6 | 684 | 974.4 | 70.20 | 6 | 6012.4 |

*n is the ratio of caprolactone to 12-hydroxystearic acid. The FW of the copolymer is the calculated weight of the product of caprolactone and 12-hydroxystearic acid. The esterified MW is the result of esterification of the hydroxyacid intermediate and capping with stearic acid, i.e., the expected molecular weight of the tooth.

Example 2

This example illustrates a polyester tooth material which is prepared with caprolactone initiated by 2,2'-bis(hydroxymethyl)propionic acid. This polyester has hydroxyl end groups and is branched in the middle of the tooth where its single hydroxyl group is located. The following mixture was charged to a nitrogen blanketed reactor fitted with a stirrer, thermocouple and reflux condenser.

| Parts | Component |
|---|---|
| 1141.5 | Caprolactone |
| 134.1 | 2,2'-Bis(hydroxymethyl) propionic acid |
| 1.7 | Dibutyl tin dilaurate (10% solution) in xylene |

The mixture was heated at 150° C. for 4 hours to completely polymerize the caprolactone. When cooled the product was an opaque white solid. The comb dispersant was branched in the middle of the tooth at the attachment point to the backbone. The reaction product was characterized as follows:

| Parameter | Value |
|---|---|
| Solid (Percent) | 99.33 |
| Acid Number (Solids Basis) | 43.0 |
| $M_n$ calc from Acid Number | 1305 |
| $M_n$ found by SEC (PS standards) | 3370 |

Example 3

This example illustrates a tooth made from 2-ethyl-1-hexanol, caprolactone, phthalic anhydride, and Cardura TM E Ester. The following materials were charged to a reactor fitter with a stirrer, thermocouple, reflux condenser and nitrogen blanket.

| Parts | Material |
|---|---|
| 62.7 | 2-Ethyl-1-hexanol (from Aldrich) |
| 660.8 | Caprolactone EC-HP (from Union Carbide Corp.) |
| 357.3 | Phthalic anhydride (From Baker Co.) |
| 487.5 | Cardura TM E-10 (from Shell Chem. Co.) |
| 2.5 | Dibutyl tin dilaurate (10%) in xylene |
| 392.1 | n-Butyl propionate (from Union Carbide Corp.) |

The components were mixed and heated to 120° C. The heat was cut and an exotherm was watched. The temperature was kept below 180° C. The mixture was heated at 170° C. for 6 hours. During the heat up, there was a 5.4 degree exotherm from 120° to 125.4° C. The reaction was complete after the 6 hours heating at 160° to 170° C. The reaction product was characterized as follows:

| Parameter | Value |
|---|---|
| Solids (Percent) | 79.78 (Theory = 79.9) |
| GH Visc R | 4.7 Stokes |
| Acid No. | 16.16 (solution), 20.26 (solids basis) |
| Minolta Color L | 100.49, a − 0.71, b + 3.01, i.e., almost colorless |
| $M_n$ calculated for monoacid from the acid number | 2769 |
| $M_w$ using PS standards | $M_n$ 3140, $M_w$ 4740 |

Example 4

This example illustrates the preparation of a tooth using 2-ethyl-1-hexanoic acid initiated phthalic anhydride copolymer. The following materials were charged to a reactor fitter with a stirrer, thermocouple, reflux condenser and nitrogen blanket.

| | Parts by Weight | Material |
|---|---|---|
| Part I | 11.54 | 2-Ethyl-1-hexanoic acid (from Aldrich) |
| | 142.9 | Phthalic anhydride |
| | 120.0 | Propylene glycol monomethyl ether acetate |
| | 1.92 | Dimethyl distearyl ammonium acetate (25%) in toluene (from Akzo) |
| Part II | 230 | Glydex ® N-10 (from Exxon) |

Part I was charged to the reactor and heated to 110° C. to obtain a solution. Part II was added over about 1 hour maintaining the temperature between 110° and 120° C. The mixture was heated for 7 hours at 120° C., followed by 3 hours at 140° C. to complete the polymerization. The reaction product was characterized as follows:

| Parameter | Value |
|---|---|
| Solids (%) | 73.4 (Theoretical = 76.2) |
| GH Visc | Z2-½ (31.6 Stokes) |
| Acid No. | 16.98 (solution), (23.1 solids basis, expected 25.1) |
| calc. Mn for monoacid | 2428 |
| Minolta Color L | 98.82, a − 0.89, b + 7.98, i.e., light yellow |

Example 5

This example illlustrates the preparation of a random copolyester having the following weight and molar composition:

| Component | Wt. % | Mole % |
|---|---|---|
| Trimethylol propane | 10.9 | 15 |
| Neopentyl glycol | 33.6 | 40 |
| Adipic acid | 13.1 | 11 |
| Hexahydrophthalic anhydride | 13.9 | 11 |
| Tetrahydrophthalic anhydride | 27.3 | 22 |
| Phthalic anhydride | 1.2 | 1.0 |

A polyester was prepared by heating Part I materials (below) in a reactor while azeotropically removing water. When the acid number reached 12, the product was thinned for use by the addition of Part II (below).

|        | Parts | Material                    |
|--------|-------|-----------------------------|
| Part I | 43.4  | Xylene                      |
|        | 71.3  | Solvesso TM 150 (Exxon)     |
|        | 227.0 | Neopentyl Glycol            |
|        | 92.7  | Hexahydrophthalic anhydride |
|        | 73.0  | Trimethylol propane         |
|        | 87.7  | Adipic acid                 |
|        | 183.0 | Tetrahydrophthalic anhydride |
|        | 8.1   | Phthalic anhydride          |
| Part II| 48.5  | Xylene                      |
|        | 60.6  | Solvesso ® 150              |

The reaction product was characterized as follows:

| Parameter | Value |
|-----------|-------|
| Solids (%) | 70.0 |
| GH Visc. | Y-½ (15.2 Stokes) |
| Acid No. | 12 |
| $M_n$ for monoacid | 4675 |
| $M_n$ (PS standard) | 3270 |
| $M_w$ (PS standard) | 8630 |
| Minolta Color L | 100.64, a − 0.30, b + 1.85, i.e, almost colorless |

Example 6

This example illustrates the preparation of an acrylic backbone for a pigment dispersant according to the present invention. This backbone is a random n-butyl methacrylate/2,3-epoxypropyl methacrylate (40/60) copolymer. The following materials were charged to a reactor fitted for reflux control of temperature in the order indicated below.

| Part | Parts by Wt. | Material |
|------|--------------|----------|
| I    | 148.9        | n-Butyl acetate |
|      | 25.5         | Toluene |
|      | 41.4         | Ethyl acetate |
| II   | 155.4        | n-Butyl methacrylate |
|      | 233.1        | 2,3-Epoxypropyl methacrylate (GMA) |
| III  | 18.7         | Vazo TM 67 initiator (DuPont) |
|      | 56.0         | n-Butyl acetate |
| IV   | 4.8          | Vazo TM 67 initiator (DuPont) |
|      | 14.3         | n-Butyl acetate |
| V    | 102.0        | n-Butyl acetate |
|      | 48.3         | Propylene glycol monomethyl ether acetate |

Part 1 was charged into the reactor and brought to reflux. Part II and III were added simultaneously and uniformly over 2 hours while maintaining reflux. Part IV was added over 30 minutes immediately after the completion of Part II and III. The reaction mixture was held at reflux for 30 minutes. The heat was cut and Part V added. The batch was cooled. The reaction products were characterized as follows:

| Parameter | Value |
|-----------|-------|
| Solids (%) | 45.7 |
| GH Visc. | A-½, (0.455 Stokes) |
| $M_n$ | 4770 |
| $M_w$ | 7740 |
| D | 1.62 |
| $M_z$ | 16000 |

Polystyrene standards were used. Assuming the polymer has an actual $M_n$ of 4770, the functionality in GMA was calculated to be 20.15 (60%) based on a $M_w$ of 142.

Example 7

This example illustrates the preparation of a comb dispersant using the 12-HSA copolymer tooth from Example 1. This acrylic/polyester comb polymer had the following composition calculated by wt. of solid material charged:

| Wt. % | Component |
|-------|-----------|
| 19.4  | n-BMA/GMA 40/60 copolymer (Example 6) |
| 8.5   | Phthalimide |
| 72.1  | Caprolactone/12HSA copolymer (Example 1) |

The following materials were charged to a nitrogen blanketed reactor as indicated in the procedure. The reactor was fitted with a heating mantle, stirrer, thermocouple, and reflux condenser.

| Order | Parts by Weight | Material |
|-------|-----------------|----------|
| I     | 933.8           | Acrylic copolymer (Example 6) |
|       | 725.0           | Monomethyl ether of propylene glycol acetate |
| II    | 1783.2          | Caprolactone/12HSA copolymer tooth (Example 1) |
| III   | 187.0           | Phthalimide |
| IV    | 37.7            | 40% benzyl trimethylammonium hydroxide in methanol |

Part I was charged into the reactor and stirred to obtain a solution. Part II was charged and mixed until uniform. Part III was charged (but will not dissolve until heated). Finally, Part IV was charged. The mixture was heated with stirring to 110° C. at which point the reaction became exothermic and heating was discontinued. The peak temperature of 119.8° C. occurred 20 minutes after heating was discontinued. The temperature dropped to 110.8° C. over 30 minutes. Heating was resumed to hold the temperature at 110° C. for the following 3 hours. At that point the acid number was determined to be 0.15, indicating that the reaction was complete. The product exhibited the following characteristics:

| Parameter | Value |
|-----------|-------|
| Solids (%) | 60.76 (theory = 60.0) |
| Viscosity, Gardner Holdt | Z (22.7 Stokes) |
| $M_n$ | 20,300 |
| $M_w$ | 47,600 (polystyrene standards) |

Dispersants with different amounts of phthalimide were made by the same procedure, in each case allowing for 95% consumption of the backbone oxirane:

| Trial | Phthalimide (%) | Acrylic (%) | Polyester (%) |
|-------|-----------------|-------------|---------------|
| 6-a   | 16              | 30.82       | 53.18         |
| 6-b   | 12              | 24.14       | 63.87         |

-continued

| Trial | Phthalimide (%) | Acrylic (%) | Polyester (%) |
|---|---|---|---|
| 6-c | 4 | 11.79 | 84.21 |

The products had the following characteristics:

| Trial | Solids (%) | Visc. (Stokes) | Mn; Mw |
|---|---|---|---|
| 6-a | 61.45 | Z-5 (98.5) | 11,300; 29,200 |
| 6-b | 60.88 | Z-3 (46.30) | 18,100; 45,700 |
| 6-c | 60.28 | Z-3 (46.30) | 35,700; 90,200 |

Example 8

This example illustrates the preparation of a dispersant using caprolactone/2, 2'-bis(hydroxymethyl)propionic acid (BHMPA) teeth. The dispersant has the following overall composition:

| Component | Percent |
|---|---|
| BMA/GMA (40/60) copolymer (Example 6) | 26.6 |
| Phthalimide | 8.49 |
| Copolyester teeth (Example 2) | 64.9 |

The following materials were charged to a nitrogen blanketed reactor as indicated in the procedure. The reactor was fitted with a heating mantle, stirrer, thermocouple, and reflux condenser.

| Order | Parts by Weight | Material |
|---|---|---|
| I | 582.2 | Acrylic copolymer (Example 6) |
| | 322 | Monomethyl ether of propylene glycol acetate |
| II | 653.4 | Caprolactone/DMPA teeth (Example 2 above) |
| III | 84.9 | Phthalimide |
| IV | 23.5 | 40% Benzyl trimethylammonium hydroxide in methanol |

Part I was charged and stirred to obtain a solution. Part II was charged and mixed until uniform. Part III was charged, but will not dissolve until heated. Finally Part IV was charged. The mixture was heated with stirring to 110° C. at which point the reaction became exothermic and heating was discontinued. The peak temperature was 119.1° C. and occurred 38 minutes after heating was discontinued. The temperature dropped to 110.8° C. over 30 minutes. Heating was resumed to hold the temperature at 110° C. for the following 3 hours and 30 minutes. At that point the acid number was determined to be 0.11, indicating that the reaction was complete. The product had the following characteristics:

| Parameter | Value |
|---|---|
| Solids (%) | 60.06 (theory = 60.02) |
| GH Visc | R-¼ (4.62 stokes) |
| Acid No. | 0.11 |
| Calc. OH No. | 57.1 (solids basis, for teeth OH's only) |
| Minolta color | L = 99.34, a − 1.06, b 6.49 |
| $M_n$ | 8060 |
| $M_w$ | 26100 (using polystyrene standards) |

The chromatograph had a single peak indicating complete consumption of the tooth. The solution did not crystallize upon long standing at room temperature.

Example 9

This example illustrates a dispersant using mixed teeth from Examples 1 and 2 both. The dispersant has the following overall composition:

| Component | Percent |
|---|---|
| BMA/GMA (40/60) copolymer (Example 6) | 23.28 |
| Phthalimide | 8.55 |
| Copolyester Tooth (Example 1) | 34.09 |
| Copolyester Tooth (Example 2) | 34.08 |

The following materials were charged to a nitrogen blanketed reactor as indicated in the procedure. The reactor was fitted heating mantle, stirrer, thermocouple, and reflux condenser.

| Order | Parts by Weight | Material |
|---|---|---|
| I | 509.5 | Acrylic copolymer (Example 6) |
| | 322 | monomethyl ether of propylene glycol acetate |
| II | 383.2 | Caprolactone/12-HSA teeth (Example 1 above) |
| | 343.1 | Caprolactone/DMPA teeth (Example 2 above) |
| III | 85.5 | Phthalimide |
| IV | 20.5 | 40% benzyl trimethylammonium hydroxide in methanol |

Part I was charged and stirred to obtain a solution. Part II was charged and mixed until uniform. Part III was charged, but will not dissolve until heated. Finally Part IV was charged. The mixture was heated with stirring to 110° C. at which point the reaction became exothermic and heating was discontinued. The peak temperature of 118.3° C. occurred 33 minutes after heating was discontinued. The temperature dropped to 110.8° C. over 30 minutes. Heating was resumed to hold the temperature at 110° C. for the following 3 hours and 15 minutes. At that point the acid number was determined to be 0.11, indicating that the reaction was complete. The product had the following characteristics:

| Parameter | Value |
|---|---|
| Solids (%) | 60.49 (Theory = 60.10) |
| GH Visc | W (10.7 stokes) |
| Acid No. | 0.11 |
| Calc. OH No. | 30.6 (solids basis, for teeth OH's only) |
| Minolta color | L = 98.08, a − 1.34, b 10.81 (light yellow, clear) |
| $M_n$ | 10,000 |
| $M_w$ | 37,300 (using polystyrene standards). |

The chromatograph had a single peak indicating complete consumption of the tooth. The solution did not crystallize upon long standing at room temperature.

Example 10

This Example illustrates a comb polymer dispersant from phthalate containing tooth from Example 3. The dispersant has the following overall composition:

| Component | Percent |
|---|---|
| BMA/GMA (40/60) copolymer (Example 6) | 21.07 |
| Phthalimide | 8.22 |

-continued

| Component | Percent |
| --- | --- |
| Phthalate polyester Teeth (Example 3) | 70.70 |

The following materials were charged to a nitrogen blanketed reactor as indicated in the procedure. The reactor was fitted with a heating mantle, stirrer, thermocouple, and reflux condenser.

| Order | Parts by Weight | Material |
| --- | --- | --- |
| I | 1024.5 | Acrylic copolymer (Example 6) |
|  | 627.1 | Monomethyl ether of propylene glycol acetate |
| II | 1955 | Phthalate copolyester tooth, Example 3 |
| III | 182.7 | Phthalimide |
| IV | 41.0 | Benzyl trimethylammonium hydroxide (40%) in methanol |

Part I was charged and stirred to obtain a solution. Part II was charged and mixed until uniform. Part III was charged, but will not dissolve until heated. Finally Part IV was charged. The mixture was heated with stirring to 110° C. at which point the reaction became exothermic and heating was discontinued. The peak temperature of 119.2° C. occurred 13 minutes after heating was discontinued. The temperature dropped to 110° C. over 15 minutes. Heating was resumed to hold the temperature at 110° C. for the following 2 hours and 30 minutes. At that point the acid number was determined to be 0.11, indicating that the reaction was complete. The product had the following characteristics:

| Parameter | Value |
| --- | --- |
| % Solids | 58.9 (Theory 57.8) |
| GH Visc | K-¼ (2.6 stokes) |
| Acid No. | 0.11 |
| Minolta color | L 99.46, a − 1.74, b 8.31 (light yellow, clear) |
| $M_n$ | 4980 |
| $M_w$ | 16000 (using polystyrene standards). |

The chromatograph had two peaks suggesting that the polyester tooth contained some non-carboxylic material. The higher molecular weight fraction comprised 46% of the product and had a $M_n$ of 21,400 and a $M_w$ of 29,300. The lower molecular weight fraction comprised 54% of the product and had a $M_n$ of 2970 and a $M_w$ of 5150.

Example 11

This example illustrates a dispersant made using the random copolyester polyol of Example 5. The dispersant has the following overall composition:

| Component | Percent |
| --- | --- |
| BMA/GMA (40/60) copolymer (Example 6) | 18.35 |
| Phthalimide | 8.52 |
| Copolyester polyol teeth (Example 5) | 73.13 |

The following materials were charged to a nitrogen blanketed reactor as indicated in the procedure. The reactor was fitted heating mantle, stirrer, thermocouple, and reflux condenser.

| Order | Parts | Material |
| --- | --- | --- |
| I | 401.4 | Acrylic copolymer (Example 6) |
|  | 120 | Monomethyl ether of propylene glycol acetate |
| II | 1044.7 | Copolyester polyol (Example 5) |
| III | 85.24 | Phthalimide |
| IV | 16.2 | Benzyl trimethylammonium hydroxide (40%) in methanol |

Part I was charged and stirred to obtain a solution. Part II was charged and mixed until uniform. Part III was charged, but will not dissolve until heated. Finally Part IV was charged. The mixture was heated with stirring to 110° C. at which point the reaction became exothermic and heating was discontinued. The peak temperature of 113.4° C. occurred 33 minutes after heating was discontinued. The temperature dropped to 110° C. over 20 minutes. Heating was resumed to hold the temperature at 110° C. for the following 3 hours and 50 minutes. At that point the acid number was determined to be 0.11, indicating that the reaction was complete. The product had the following characteristics:

| Parameter | Value |
| --- | --- |
| % Solids | 60.04 (Theory = 59.97) |
| GH Visc | Y-¼ (16.40 Stokes) |
| Minolta color | L = 92.55, a 0.54, b 29.16 (medium yellow, clear) |
| $M_n$ | 4850 |
| $M_w$ | 206,000 (using polystyrene standards) |

The chromatograph had two peaks suggesting that the polyester teeth contained some non-carboxylic material. The separation was not sufficient to resolve the peaks. The product had a high molecular weight component leading to the high $M_w$. This was probably caused by some diacid functional polyester in the random polyol.

Example 12

This example illustrates the preparation of a dispersant using 12-HSA copolymer teeth from Example 1 and saccharin as the pigment active group. This acrylic/polyester comb polymer had the following composition calculated by wt. of solid material charged:

| Wt. % | Component |
| --- | --- |
| 16.08 | n-BMA/GMA 40/60 copolymer, Example 6 |
| 8.5 | Saccharin |
| 75.42 | Caprolactone/12HSA copolymer (Example 1) |

The following materials were charged to a nitrogen blanketed reactor as indicated in the procedure. The reactor was fitted with a heating mantle, stirrer, thermocouple, and reflux condenser.

| Order | Parts | Material |
| --- | --- | --- |
| I | 188.3 | Acrylic copolymer (Example 6) |
|  | 198 | Monomethyl ether of propylene glycol acetate |
| II | 451.6 | Caprolactone/12HSA copolymer teeth (Example 1) |
| III | 45.5 | Saccharin |
| IV | 7.6 | Benzyl trimethylammonium hydroxide |

| Order | Parts | Material |
|---|---|---|
| | | (40%) in methanol |

Part I was charged and stirred to obtain a solution. Part II was charged and mixed until uniform. Finally, Part III was charged (will not dissolve until heated), followed by Part IV. The mixture was heated with stirring to 110° C. at which point the reaction became exothermic and heating was discontinued. The peak temperature of 116.4° C. occurred 5 minutes after heating was discontinued. The temperature dropped to 110.4° C. over 21 minutes. Heating was resumed to hold the temperature at 110° C. for the following 3 hours. At that point the acid number was determined to be 4.2. Heating was continued for 12 more hours at 130°–150° C. to give a final acid number of 2.2 indicating that the reaction was complete. The product was diluted with 467 g. of 1,2-prolylene carbonate to reduce the viscosity and completely dissolve the product. The reaction product exhibited solids percent of 46% and a viscosity (Gardner Holdt) of T+¼ (5.7 Stokes).

Example 13

This example illustrates a dispersant using 12-HSA copolymer tooth from Example 1 and succinimide as the pigment active group. This acrylic/polyester comb polymer had the following composition calculated by wt. of solid material charged:

| Wt. % | Component |
|---|---|
| 24.6 | n-BMA/GMA 40/60 copolymer, Example 6 |
| 8.06 | Succinimide |
| 67.35 | Caprolactone/12HSA copolymer (Example 1) |

The following materials were charged to a nitrogen blanketed reactor as indicated in the procedure. The reactor was fitted with a heating mantle, stirrer, thermocouple, and reflux condenser.

| Order | Parts | Material |
|---|---|---|
| I | 430.6 | Acrylic copolymer (Example 6) |
| | 217 | Monomethyl ether of propylene glycol acetate |
| II | 603.6 | Caprolactone/12HSA copolymer teeth (Example 1) |
| III | 64.5 | Succinimide |
| IV | 17.4 | Benzyl trimethylammonium hydroxide (40%) in methanol |

Part I was charged and stirred to obtain a solution. Part II was then charged and mixed until uniform. Part III was dissolved with heating and then Part IV charged. The mixture was heated with stirring to 110° C. at which point the reaction became exothermic and heating was discontinued. The peak temperature of 120° C. occurred minutes after heating was discontinued. The temperature dropped and heating was resumed to hold the temperature at 110° C. for the following 3 hours. At that point the acid number was determined. The percent solids was 60.97% and the Viscosity (Gardner Holdt) was Z5+¼ (110.8 Stokes).

Examples 14–17

Dispersions were made using a 01 batch attritor made by Union Process Attritor Technology. The attritor pot has an empty volume of 570 cc. The grinding media used was ⅛ inch steel shot. About 1860 g of shot having a volume of 400 cc was added to the attritor pot. The grinding is accomplished using a motor driven spindle measuring 18 cm in length and 12 mm in diameter with 8 arms at the base, each measuring 3 cm in length and 5 mm in diameter. The spindle is driven at 350 rpm for a duration of 12 hours for each dispersion.

The dispersions were loaded on a volume basis in which 315 cc of each of the premixes described below was added to the attritor pot. The premixes were prepared in a separate container using an air driven DBI (diagonal blade impeller) mixer for 15 minutes to suitably mix the ingredients and wet out the pigment prior to grinding. After completion of the premix stage, the 315 cc of premix is added to the attritor pot containing the spindle and media. Next the spindle is connected to the motor and regulated to 350 rpm and the grinding performed for a total of 12 hours. Cooling water is passed through a jacket on the attritor to maintain a temperature between 100°–135° F.

The key dispersion property for assessing effective stabilization by the dispersants was rheology measurements. The viscosities were measured using a Brookfield, model RVT, viscometer. The dispersions were judged to be acceptable if the initial viscosity was no higher than 1000 centipoise, and if the viscosity did not double after one week.

Example 13

This example illustrates pigment dispersions using the dispersant from Example 7 and 12-HSA copolymer tooth from Example 1 with 8.49% phthalimide. The following materials were blended and milled as described above:

| Parts | Material |
|---|---|
| 73.55 | Monastral Magenta, RT-3430 (from Ciba Geigy) |
| 66.20 | Dispersant (Example 7) |
| 228.01 | n-Butyl acetate |

The dispersion had the following physical characteristics:

| Parameter | Value |
|---|---|
| Gallon wt. | 8.313 lb. |
| Wt. solids (percent) | 30.66 |
| Vol. solids (percent) | 22.79 |
| Pigment/binder ratio by weight | 182.15/100 |

The following viscosity information was obtained as described above using the #2 spindle at 75° F.

| RPM | Visc. (cps) initial | Visc. (cps) after 1 week |
|---|---|---|
| 1 | 40 | 40 |
| 20 | 40 | 40 |
| 50 | 54 | 54 |

These results indicate that a stable, low viscosity dispersion was produced.

The following materials were blended and milled as described above to produce a carbon black dispersion.

| Parts | Material |
| --- | --- |
| 54.95 | Degussa carbon black beads FW-200 |
| 87.93 | Dispersant (Example 7) |
| 223.48 | n-Butyl acetate |

The dispersion had the following physical characteristics:

| Parameter | Value |
| --- | --- |
| Gallon Wt. | 8.33 lb |
| Wt. Solids (percent) | 29.23 |
| Vol. Solids (percent) | 22.03 |
| Pigment/Binder ratio by wt | 102.46/100 |

The following viscosity information was obtained as described above using the #2 spindle at 75° F.

| RPM | Visc. (cps) initial | Visc. (cps) 1 week |
| --- | --- | --- |
| 1 | 240 | 200 |
| 20 | 170 | 196 |
| 50 | 171 | 192 |

These results indicate that a stable, low viscosity dispersion was produced.

The following materials were blended and milled as described above to produce a red iron oxide dispersion.

| Parts | Material |
| --- | --- |
| 107.99 | Iron oxide red, L2917 (BASF Corp. SICOTRANS ™) |
| 129.59 | Dispersant (Example 7) |
| 194.39 | n-Butyl acetate |

The dispersion had the following physical characteristics:

| Parameter | Value |
| --- | --- |
| Gallon Wt. | 9.82 lb |
| Wt. Solids (percent) | 42.50 |
| Vol. Solids (percent) | 26.89 |
| Pigment/Binder ratio by wt | 136.61/100 |

The following viscosity information was obtained as described above using the #2 spindle at 75° F.

| RPM | Visc. (cps) initial | Visc. (cps) 1 week |
| --- | --- | --- |
| 1 | 400 | 560 |
| 20 | 340 | 436 |
| 50 | 336 | 396 |

These results indicate that a stable, low viscosity dispersion was produced.

The following materials were blended and milled as described above to produce a maroon dispersion.

| Parts | Material |
| --- | --- |
| 117.16 | Perindo Maroon, R-6436 (Miles Inc.) |
| 66.39 | Dispersant (Example 7) |
| 206.98 | n-Butyl acetate |

The dispersion had the following physical characteristics:

| Parameter | Value |
| --- | --- |
| Gallon Wt. | 8.88 lb |
| Wt. Solids (percent) | 39.68 |
| Vol. Solids (percent) | 29.29 |
| Pigment/Binder ratio by wt | 289.30/100 |

The following viscosity information was obtained as described above using the #2 spindle at 75° F.

| RPM | Visc. (cps) initial | Visc. (cps) 1 week |
| --- | --- | --- |
| 1 | 120 | 120 |
| 20 | 82 | 92 |
| 50 | 94.4 | 101.6 |

These results indicate that a stable, low viscosity dispersion was produced.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

We claim:

1. A composition comprising a comb-like graft copolymer pigment dispersant having a molecular weight of 4000 to 50,000 consisting essentially of the reaction product of:
   (a) about 20 to 80 percent by weight of the dispersant of a polyester copolymer, or mixture of different polyester copolymers, having a molecular weight of about 500 to 10,000 which polyester copolymer is carboxylic-acid functional;
   (b) about 15 to 50% by weight of the dispersant of an acrylic copolymer made from the monomers of alkyl (meth)acrylates and an oxirane containing acrylic monomer and having a molecular weight of about 2500 to 10,000 which, before reaction, contains 25 to 75 percent by weight of an oxirane containing monomeric unit;
   (c) about 2 to 20 percent, by weight of the dispersant, of a cyclic imide monomeric unit.

2. The composition of claim 1, further comprising hydroxy functionality on said polyester copolymer.

3. The composition of claim 1 wherein the oxirane containing monomeric unit is either glycidyl acrylate or glycidyl methacrylate.

4. The composition of claim 1, further comprising hydroxy functionality on said acrylic copolymer.

5. The composition of claim I wherein said polyester copolymer comprises monomeric units of a lactone.

6. The composition of claim 1 wherein said polyester copolymer comprises monomeric units of a saturated or unsaturated fatty acid or a hydroxy-functional aliphatic acid.

7. The composition of claim 1 wherein the polyester is the reaction product of a mixuture comprising cyclic anhydride containing monomers, epoxy containing monomers, and lactone containing monomers.

8. The composition of claim 1, wherein said cyclic imide is selected from the group consisting of phthalimide, succinimide, maleimide, and mixtures thereof.

9. A dispersion of a pigment comprising the composition of claim 1.

10. A method of making a dispersant comprising simultaneously reacting:
(a) about 20 to 85 percent by weight of the dispersant of an acid functional polyester copolymer having a molecular weight of about 500 to 10,000 and which is carboxylic-acid functional;
(b) about 10 to 50% by weight of the dispersant of an oxirane-containing acrylic copolymer made from the monomers of alkyl (meth)acrylates and an oxirane containing acrylic monomer and having a molecular weight of 2500 to 10,000 and which, before reaction, contains 25 to 75 percent by weight of an oxirane containing monomeric unit; and
(c) about 2 to 20 percent by weight of the dispersant of an cyclic imide containing monomeric unit.

* * * * *